J. M. OLINGER.
ELECTRICAL COLLECTOR.
APPLICATION FILED OCT. 27, 1919.
1,375,412.
Patented Apr. 19, 1921.
2 SHEETS—SHEET 1.
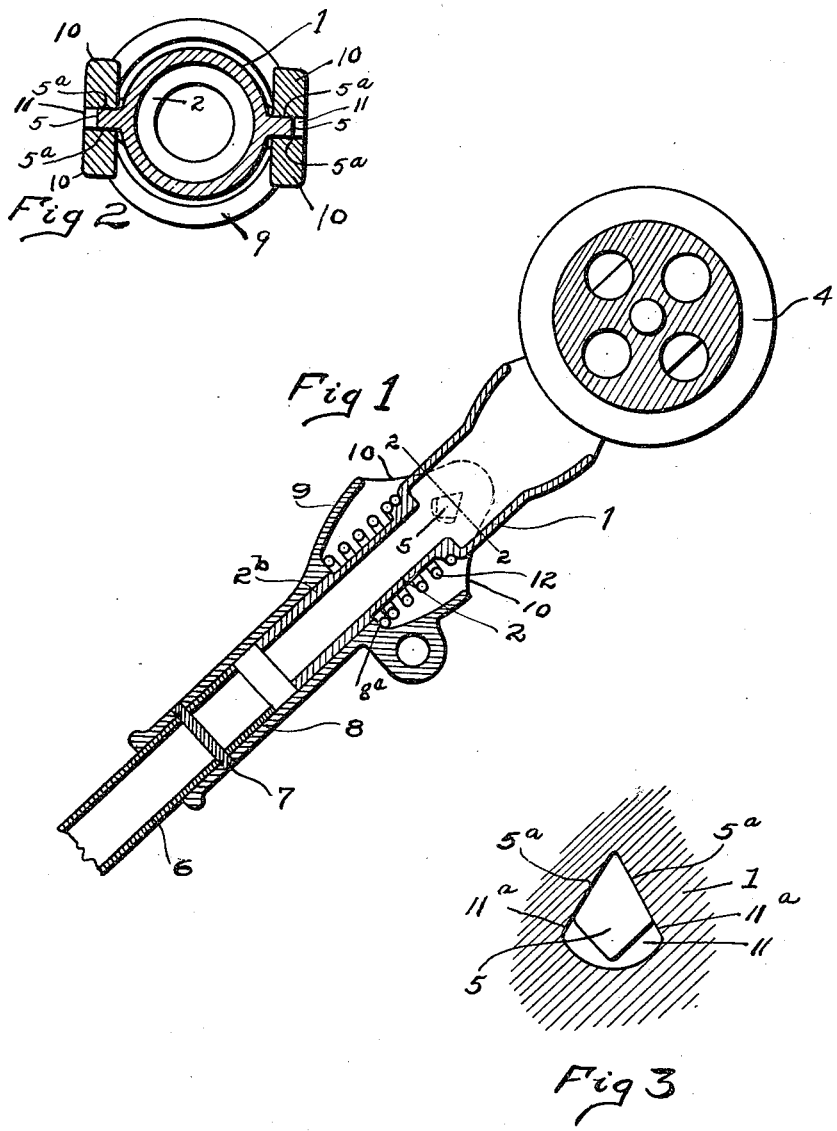
Inventor
Jacob M. Olinger
By
Attorneys

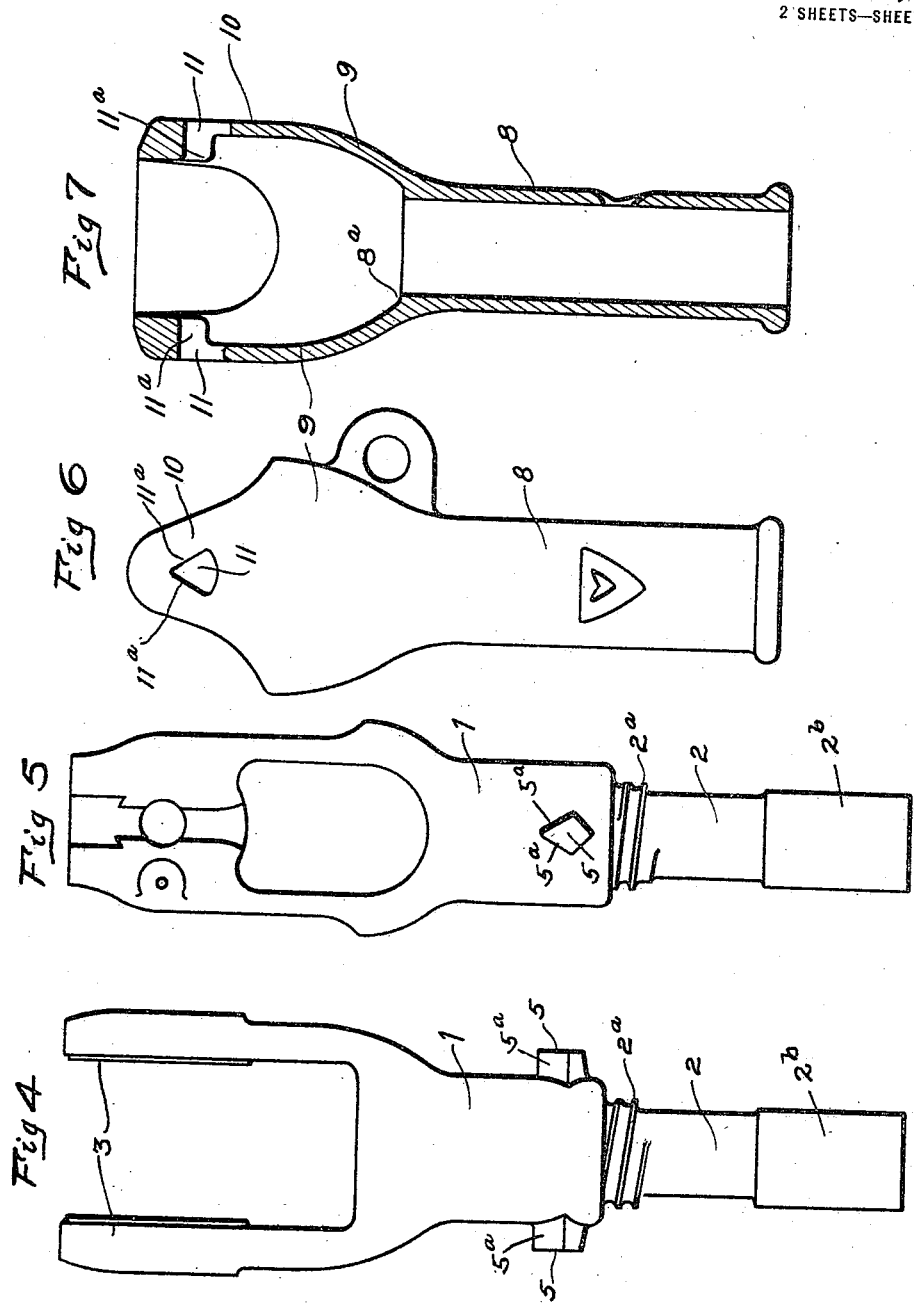

UNITED STATES PATENT OFFICE.

JACOB M. OLINGER, OF SPRINGFIELD, OHIO.

ELECTRICAL COLLECTOR.

1,375,412.

Specification of Letters Patent. Patented Apr. 19, 1921.

Application filed October 27, 1919. Serial No. 333,431.

*To all whom it may concern:*

Be it known that I, JACOB M. OLINGER, a citizen of the United States, residing at Springfield, in the county of Clark and State of Ohio, have invented certain new and useful Improvements in Electrical Collectors, of which the following is a specification.

My invention relates to improvements in trolley heads for under-running collectors of electrical energy, it particularly relating to a trolley head of the detachable type.

The object of my invention is to improve upon the construction described in my prior Patent No. 740,037 dated Sept. 9th, 1903, by providing a more simple and economical arrangement for constructing the head and attaching the same to the trolley pole.

In the accompanying drawings:—

Figure 1 is a longitudinal section of the trolley head and the devices for attaching it to the pole.

Fig. 2 is a transverse section on the line 2—2 of Fig. 1.

Fig. 3 is an enlarged detail of a portion of the head and the attaching sleeve.

Fig. 4 is a front view of the head.

Fig. 5 is a view of one of the sides thereof.

Fig. 6 is a side view of the coupling sleeve between the head and the pole.

Fig. 7 is a longitudinal sectional view of the said sleeve.

In the said drawings, 1 represents the head proper having a lower reduced stem 2 and an upper bifurcated portion 3. Both the head proper and its stem are cast hollow to afford lightness and save material and in the bifurcated portion 3 is rotatably mounted in any suitable manner the trolley wheel 4. On the lower portion of the head are two ears or lugs 5, arranged diametrically opposite each other. Each of these lugs has the upper half thereof formed with two straight side faces $5^a$, which converge inwardly toward the top, as shown.

Secured to the upper end of the trolley pole, represented by 6, preferably by a rivet 7, is a sleeve 8 having an enlarged upper end 9 with two oppositely arranged projecting ears 10. Each ear has an aperture 11 and the walls of these ears above the apertures are extended inwardly or made thicker so as to provide seats $11^a$ which overhang the interior of the main portion of the sleeve enlargement 9. The faces which form these seats $11^a$ are converged inwardly toward the top and project at about the same angle as the faces of the lugs 5, so as to form overhanging inverted V-shaped notches.

The stem 2 of the trolley head is provided on the extreme upper portion thereof with screw threads $2^a$ upon which are threaded the upper part of a coil spring 12, and the lower portion of the stem, represented by $2^b$, is cast slightly larger than the upper portion so that it may be turned down to snugly fit the sleeve 8, when assembled.

In attaching the head to the pole, the head is turned so that the lugs 5 thereof will be out of line with the ears 10 and the head and its stem may then be inserted within the sleeve 8 and its enlarged portion 9, until the lower end of the spring 12 rests upon the shoulder $8^a$ formed at the juncture of the sleeve and its enlarged portion 9, the upper end of the spring resting against the shoulder formed by the head proper and its reduced stem 2. The distance between the interior faces of the projections 10, below the V-shaped notches, is slightly greater than the distance from the outer end of one ear 5 to the outer end of the other so that by pressing down upon the head and compressing the spring the head may be turned until the ears 5 coincide with the notches, after which, by releasing the pressure upon the head the spring will throw the same upwardly until the lugs enter the notches and thereby yieldingly lock the head in position. The head may be readily detached from the pole by reversing this operation.

By the construction described a simple and effective detachable head is provided for the contact member of the collector. The construction is such as to require but very little machine work, practically the only work of this character being that upon the lower portion $2^b$ of the stem of the head. By constructing the interlocking lugs and notches in the manner described, a wide bearing is provided at that point, which in connection with the snug fit of the lower portion of the stem in the sleeve 8 and the employment of the spring, holds the head in rigid relation with the pole.

The form of the notches and lugs also permits the head to readily seat itself when being attached.

Having thus described my invention, I claim:—

1. In a device of the character described, a contact carrying member, a pole member, said pole member having a portion arranged to receive a portion of said contact member in the individual assembled condition of the parts of each of said members, the interior of said pole member having notches the walls of which overhang, lugs on the exterior of said contact member, and a spring between said members to hold said lugs in said notches.

2. In a device of the character described, a contact carrying member having a stem, a pole member having a socket, the interior of said socket having oppositely arranged notches, the walls of which overhang, lugs on the exterior of said pole member, said contact carrying member being capable of being inserted in said pole member and the lugs thereof caused to engage the notches in the complete individual assembled condition of each of said members, and a spring about said stem and between said members to hold said lugs in said notches.

3. In a device of the character described, a contact carrying member having a stem, a pole member having a sleeve to receive the pole and an enlarged socket portion, the interior of said socket portion having oppositely arranged notches the walls of which overhang, oppositely arranged lugs on said contact member, the lower portion of said stem being arranged to fit the interior of said sleeve, said members being capable of being connected together or detached from each other in the complete individual assembled condition of each of said members, and a spring about said stem and between said members.

4. In a device of the character described, a contact carrying member, a pole member, said pole member having a portion arranged to receive a portion of said contact member in the complete individual assembled condition of each of said members, the interior of said pole member having inverted V-shaped notches the walls of which overhang, inverted V-shaped lugs on the exterior of said contact member, and a spring between said members to hold said lugs in said notches.

5. In a device of the character described, a contact carrying member, a pole member, said pole member having a sleeve to receive the pole and an enlarged portion above the sleeve having oppositely arranged projecting ears, the interior faces of said ears having notches the walls of which overhang, lugs on said contact member arranged to enter the enlarged portion of said pole member when turned out of line with said notches but capable of being turned so as to be brought in alinement therewith while both of said members are in their complete individual assembled condition, and a spring between said members to hold said lugs in said notches.

6. In a device of the character described, a contact carrying member, a pole member, said pole member having a portion arranged to receive a portion of said contact carrying member, one of said members having notches, and lugs on the other of said members, said notches and lugs being arranged to be brought into alinement with each other when said members are placed together and turned relatively to each other, and a spring for holding said lugs in said notches, the construction and arrangement of said members being such that they can be attached together or detached in the complete individual assembled condition of each of said members.

7. In a device of the character described, a contact carrying member, a pole member, lugs arranged on one of said members, the other of said members being provided with notches to receive said lugs, and a spring arranged between the members to hold said lugs in said notches, said members being capable of being inserted one within the other or detached one from the other in the complete assembled condition of each of said members.

8. In a device of the character described, a contact carrying member, a pole carrying member, oppositely arranged lugs on one of said members, the other of said members having oppositely arranged notches the walls of which overhang to receive said lugs, a spring between said members to hold said lugs in said notches, the construction and arrangement being such that said members are capable of being attached or detached in the complete assembled condition of each of said members.

In testimony whereof, I have hereunto set my hand this 21st day of October, 1919.

JACOB M. OLINGER.

Witness:
CHAS. I. WELCH.